(12) United States Patent
Quaggia (10) Patent No.: US 9,748,722 B2
(45) Date of Patent: Aug. 29, 2017

(54) TERMINATIONS FOR ELECTRICAL CABLES AND METHODS FOR MANUFACTURING SUCH TERMINATIONS

(75) Inventor: Dario Quaggia, Milan (IT)

(73) Assignee: PRYSMIAN S.p.A., Milan (IT)

( * ) Notice: Subject to any disclaimer, the term of this patent is extended or adjusted under 35 U.S.C. 154(b) by 0 days.

(21) Appl. No.: 14/115,756

(22) PCT Filed: May 19, 2011

(86) PCT No.: PCT/EP2011/002504
§ 371 (c)(1),
(2), (4) Date: Jan. 22, 2014

(87) PCT Pub. No.: WO2012/155934
PCT Pub. Date: Nov. 22, 2012

(65) Prior Publication Data
US 2014/0182878 A1    Jul. 3, 2014

(51) Int. Cl.
*H02G 15/064*    (2006.01)
*H01R 43/20*    (2006.01)
(Continued)

(52) U.S. Cl.
CPC ............ *H01R 43/20* (2013.01); *H02G 15/06* (2013.01); *H02G 15/064* (2013.01);
(Continued)

(58) Field of Classification Search
CPC ........ H02G 15/02; H02G 15/04; H02G 15/05; H02G 15/045; H02G 15/064;
(Continued)

(56) References Cited

U.S. PATENT DOCUMENTS 2,078,051 A * 4/1937 Berndt .................. H01R 4/52
403/304
3,317,654 A * 5/1967 Yonkers ...................... 174/73.1
(Continued)

FOREIGN PATENT DOCUMENTS

CN      101911415 A    12/2010
EP        2194627 A1    6/2010
(Continued)

OTHER PUBLICATIONS

International Search Report PCT/ISA/210 and Written Opinion PCT/ISA/237 for PCT/EP2011/002504 dated Mar. 2, 2012.
(Continued)

*Primary Examiner* — Ishwarbhai B Patel
*Assistant Examiner* — Paresh Paghadal
(74) *Attorney, Agent, or Firm* — MH2 Technology Law Group LLP (57) ABSTRACT

A termination for electrical cables may include: an outer insulation tubular body having a longitudinal axis; a conductive rod within the body; an elastomeric sleeve within the body and extending about an end portion of the rod; a connecting device within the sleeve, wherein the device is mechanically and electrically connected to the rod and is configured to mechanically and electrically connect to an electrical cable; a conductive tubular element within the body, configured to electrically connect to ground; a semi-conductive element within the tubular element and partially extending inside the sleeve on an opposite side to the rod with respect to the device; and at least one elastic conductive element radially interposed between, and in contact with, the tubular element and semi-conductive element, the at least one elastic conductive element configured to exert elastic force onto the semi-conductive element along at least one radial direction toward the axis.

20 Claims, 9 Drawing Sheets (51) Int. Cl.
  *H02G 15/068* (2006.01)
  *H02G 15/184* (2006.01)
  *H02G 15/06* (2006.01)
  H02G 15/105 (2006.01)
  H02G 15/10 (2006.01)
  H02G 15/02 (2006.01)
  H02G 15/103 (2006.01)

(52) U.S. Cl.
  CPC ......... *H02G 15/068* (2013.01); *H02G 15/184* (2013.01); *H02G 15/02* (2013.01); *H02G 15/10* (2013.01); *H02G 15/103* (2013.01); *H02G 15/105* (2013.01); *Y10T 29/49174* (2015.01)

(58) Field of Classification Search
  CPC .. H02G 15/068; H02G 15/103; H02G 15/105; H02G 15/184; H02G 15/06; H02G 15/10; H02G 15/18; H02G 15/13; H01R 43/20; H01R 43/26
  USPC .... 174/80, 82, 84 R, 85, 86, 88 C, 88 S, 89, 174/93, 167, 168, 169, 176
  See application file for complete search history.

(56) References Cited

U.S. PATENT DOCUMENTS

| | | | | |
|---|---|---|---|---|
| 3,517,113 | A * | 6/1970 | Yoshioka | H02G 15/06 174/19 |
| 3,576,517 | A * | 4/1971 | Johnson | H01R 13/5221 174/77 R |
| 3,702,895 | A * | 11/1972 | de Sio | H02G 15/068 174/19 |
| 3,711,818 | A * | 1/1973 | Swehla | H01R 13/53 174/73.1 |
| 3,883,680 | A * | 5/1975 | Keen, Jr. | 174/12 BH |
| 4,234,755 | A * | 11/1980 | Simons | 174/19 |
| 5,210,676 | A * | 5/1993 | Mashikian | H01C 7/12 361/117 |
| 5,316,492 | A * | 5/1994 | Schaareman | 439/206 |
| 5,952,612 | A * | 9/1999 | Winfield et al. | 174/74 R |
| 6,265,663 | B1 * | 7/2001 | Cicogna et al. | 174/73.1 |
| 7,674,124 | B2 * | 3/2010 | Nicholson | H01R 13/5202 439/281 |
| 2003/0003802 | A1 * | 1/2003 | Amerpohl | H02G 15/068 439/587 |
| 2006/0124339 | A1 * | 6/2006 | Goehlich | 174/74 R |
| 2010/0200274 | A1 * | 8/2010 | Jonsson et al. | 174/137 B |
| 2011/0114358 | A1 | 5/2011 | Takayasu et al. | |
| 2014/0182878 | A1 | 7/2014 | Quaggia | |

FOREIGN PATENT DOCUMENTS

| | | |
|---|---|---|
| EP | 2710699 A1 | 3/2014 |
| JP | 2007-159271 A | 6/2007 |
| JP | 2008-204635 A | 9/2008 |
| JP | 2008-278601 A | 11/2008 |
| JP | 2009-159743 A | 7/2009 |
| WO | WO-95/31845 A1 | 11/1995 |
| WO | WO-2006/015735 A1 | 2/2006 |
| WO | 2012155934 A1 | 11/2012 |

OTHER PUBLICATIONS

May 29, 2015, Singapore Office Action issued in corresponding Singapore Patent Application No. 2013082383.

People's Republic of China Office Action dated Dec. 25, 2015 (with English-language translation).

Canadian Office Action dated May 1, 2017, in CA Application No. 2,835,660, 3 pages.

* cited by examiner

TERMINATIONS FOR ELECTRICAL CABLES AND METHODS FOR MANUFACTURING SUCH TERMINATIONS

CROSS-REFERENCE TO RELATED APPLICATION(S)

This application is a national stage entry from International Application No. PCT/EP2011/002504, filed on May 19, 2011, in the Receiving Office of the European Patent Office, the entire contents of which are incorporated herein by reference.

The present invention relates to a termination for electrical cables, in particular for medium or high or very high voltage electrical cables.

The invention also relates to a method for manufacturing the aforementioned termination.

Throughout the present description and the attached claims, the term "termination" is used to indicate a jointing assembly specifically provided for mechanically and electrically connecting an electrical cable to a bare conductor, for example an overhead conductor, which is, in turn connected to a different device, such as for example an electrical power source, a transformer, a user device etc.

In the present description, the term "medium voltage" is used to refer to a tension typically from about 1 kV to about 30 kV, while the term "high voltage" refers to a tension above 30 kV. The term "very high voltage" is used to define a tension greater than about 150 kV or 220 kV, up to 500 kV or more.

Medium or high or very high voltage electrical cables typically comprise one or more conductors covered by an insulating layer. A conductive screen is coaxially applied at a radially outer position with respect to the insulating layer of the conductors. A semi-conductive layer is radially interposed between the insulating layer of the conductors and the conductive screen. A protective sheath is coaxially applied at a radially outer position with respect to the conductive screen.

Terminations for medium or high or very high voltage electrical cables typically comprise a sleeve made of elastomeric material and a conductive rod adapted to be connected to the bare conductor. A connector is provided inside the sleeve to mechanically and electrically connect the conductive rod to the electrical cable, so as to provide the electrical connection between the electrical cable and the bare conductor. The sleeve further comprises a semi-conductive cylindrical insert for controlling the electrical field within sleeve, in particular to avoid the presence of areas with high concentration of electrical field wherein undesired electrical discharges and breakdowns could occur. A conductive element is arranged in a radially outer position with respect to the semi-conductive cylindrical insert in a contact relationship therewith.

When connecting the electrical cable to the termination, the electrical cable is treated in such a manner that the conductors axially project by a predetermined amount with respect to the radially outer layers. Such conductors are then electrically and mechanically connected to the connector of the termination to provide the desired electrical continuity between the electrical cable and the conductive rod of the termination.

Upon connection of the electrical cable to the termination, the semi-conductive layer of the electrical cable should be arranged in a steady contact relationship with the semi-conductive insert of the termination in order to provide the electrical cable with an appropriate ground connection through the conductive element of the termination.

U.S. Pat. No. 5,316,492 discloses a plug-in connection for a high voltage plastic cable in a high voltage outside termination. The plug-in connection comprises an elastic sleeve insulator with stress-controlling electrically conducting body, an insulating body surrounding the sleeve insulator and an electrically conducting sheath surrounding the insulating body. The sleeve insulator is assembled in a mechanically strong and leak-tight manner on a metal foot plate in a ground plate of the outside termination.

The Applicant observed that the electrically conducting body and the electrically conducting sheath of a termination of the above-described type, being both made of a rigid material, cannot be radially expanded to allow the termination to be connected to electrical cables having a diameter greater than the one prefixed in the design stage.

The Applicant also observed that, should the above termination be connected with electrical cables having a diameter lower than the one prefixed in the design stage, the desired steady contact between the electrically conducting sheath of the termination and the semi-conductive layer of the electrical cable could not be achieved.

Indeed, the Applicant noticed that for the above reasons each of the terminations of the prior art can be used only with electrical cables of a specific size, that is electrical cables having different diameters require using terminations of different size to provide the electrical cables with an appropriate ground connection.

In addition thereof, the Applicant observed that, still due to the fact that the semi-conductive element of the terminations of the prior art are made of a rigid material, these terminations does not allow radial expansions of the electrical cable due to possible thermal variations occurring during the operative lifecycle thereof.

Furthermore, the Applicant observed that in the termination of U.S. Pat. No. 5,316,492 a stuffing box is provided at a radially outer position with respect to the conducting sheath to provide the desired axial tightness within the termination.

However, the Applicant noticed that such an axial tightness might be compromised should radial expansions of the electrically conducting body and the conducting sheath occur due, for example, to the fact that the termination is connected with electrical cables having a diameter higher than the one prefixed in the design stage or due to thermal variations occurring during the operative lifecycle of the electrical cable connected to the termination.

The Applicant faced the technical problem of providing a termination which is capable of being connected to electrical cables having different diameters and which allows radial expansions of the electrical cables due to thermal variations occurring during the operative lifecycle thereof, while providing at the same time the electrical cable with the appropriate ground connection by maintaining a steady contact between the semi-conductive element of the termination and the semi-conductive layer of the electrical cables.

The Applicant also faced the technical problem of providing a termination which is capable of ensuring the desired tightness both in case of different cable diameters and in presence of thermal expansions.

As disclosed in more detail below, the Applicant found that the problems above can be solved by arranging an elastic conductive element between the conductive element of the termination and the semi-conductive element of the termination, said at least one elastic conductive element exerting an elastic force onto the semi-conductive element of the termination along at least one radial direction towards the longitudinal axis of the termination.

In particular, the Applicant found that the desired steady contact between the semi-conductive element of the electrical cable connected to the termination and the semi-conductive element of the termination can be ensured, irrespective of the specific diameter of the electrical cable and irrespective of any possible thermal variation occurring during the operative lifecycle of the electrical cable, by exerting on the semi-conductive element of the termination an elastic force along at least one radial direction towards the longitudinal axis of the termination.

The semi-conductive element of the termination can thus be radially displaced towards and away from the longitudinal axis of the termination, depending on the actual diameter of the electrical cable connected thereto, while remaining in a steady electrical contact relationship with the conductive element of the termination.

Accordingly, in a first aspect thereof, the present invention relates to a termination for electrical cables, comprising:
  an outer insulation tubular body having a longitudinal axis;
  a conductive rod coaxially arranged within said insulation tubular body;
  an elastomeric sleeve coaxially arranged within said insulation tubular body and extending about an end portion of said conductive rod;
  a connecting device coaxially arranged within said elastomeric sleeve, said connecting device being mechanically and electrically connected to said conductive rod and being adapted to be mechanically and electrically connected to an electrical cable;
  a conductive tubular element coaxially arranged within said insulation tubular body and adapted to be electrically connected to the ground;
  a semi-conductive element coaxially arranged within said conductive tubular element and partially extending inside said elastomeric sleeve on the opposite side to said conductive rod with respect to said connecting device;
  at least one elastic conductive element radially interposed between, and in a contact with, said conductive tubular element and said semi-conductive element, said at least one elastic conductive element exerting an elastic force onto said semi-conductive element along at least one radial direction towards said longitudinal axis.

In a second aspect thereof, the present invention relates to a method for manufacturing a termination for electrical cables, comprising:
  providing an elastomeric sleeve having a longitudinal axis and including, in a radially inner position thereof, a connecting device;
  coaxially arranging a semi-conductive element with respect to said elastomeric sleeve so that a first portion of said semi-conductive element axially extends inside said elastomeric sleeve and a second portion of said semi-conductive element axially extends outside said elastomeric sleeve;
  inserting an end portion of a conductive rod into said elastomeric sleeve on the opposite side with respect to said to said semi-conductive element to electrically and mechanically connect said conductive rod to said connecting device;
  arranging at least one elastic conductive element in a radially inner position with respect to a conductive tubular element;
  fitting said conductive tubular element onto said second portion of said semi-conductive element so that said at least one elastic conductive element is radially interposed between, and in a contact with, said conductive tubular element and said semi-conductive element and exerts an elastic force onto said semi-conductive element along at least one radial direction towards said longitudinal axis;
  coaxially arranging an outer insulation tubular body in a radially outer position with respect to said conductive bar, said elastomeric sleeve and said conductive tubular element.

Throughout the present description and in the following claims, the terms "radial" and "axial" (or "longitudinal") are used to indicate a perpendicular direction and a parallel direction, respectively, to a reference longitudinal axis of the termination, the above reference longitudinal axis being defined by the longitudinal axis of any one among the outer insulation tubular body, the conductive rod, the elastomeric sleeve and the conductive tubular element of the termination. The expression "radially inner/outer" is instead used by referring to the position along a radial direction with respect to the abovementioned longitudinal axis.

Throughout the present description and in the following claims, the terms "above" and "below" are used with reference to an upright position of the termination, that is when the aforementioned reference longitudinal axis is oriented vertically.

In least one of the aforementioned aspects the invention can comprise at least one of the following preferred features, taken separately or in combination.

Preferably, the termination comprises a leak-tight element axially interposed between said elastomeric sleeve and said conductive tubular element.

Advantageously, the Applicant observed that the provision of a leak-tight element which acts in the axial direction between the elastomeric sleeve and the conductive tubular element allows to provide the termination with a sealing system which is not sensitive at all to possible radial expansion of the semi-conductive element of the termination due for example to thermal variations occurring during the operative lifecycle of the electrical cable connected to the termination. The desired axial sealing effect and radial electrical connection are thus provided by two different systems which are structurally and functionally independent from each other.

In a preferred embodiment thereof, the termination comprises at least two elastic conductive elements arranged at different axial positions.

Preferably, said at least one elastic conductive element comprises at least one annular spring coaxially arranged within said conductive tubular element in a radially outer position with respect to said semi-conductive element.

More preferably, said annular spring comprises a metallic wire spirally wound along an annular path extending about said longitudinal axis to define a plurality of coils.

Still more preferably, each of said coils lays on a plane which does not include said longitudinal axis.

In a preferred embodiment, said insulation tubular body is at least partially filled at least with silicone gel.

Preferably, said connecting device comprises a first seat for a plug-in connection to said electrical cable and an axially opposite seat for a plug-in connection to said conductive rod.

Preferably, the method of manufacturing the termination of the present invention comprises axially interposing a leak-tight element between said elastomeric sleeve and said conductive tubular element.

Preferably, the method of manufacturing the termination of the present invention comprises at least partially filling said insulation tubular body at least with silicone gel.

Alternatively said insulation tubular body can be filled with another insulating fluid, like oil or similar materials.

Further features and advantages of the present invention will appear more clearly from the following detailed description of some preferred embodiments thereof, such description being provided merely by way of non-limiting example and being made with reference to the annexed drawings. In such drawings.

Figure 1:
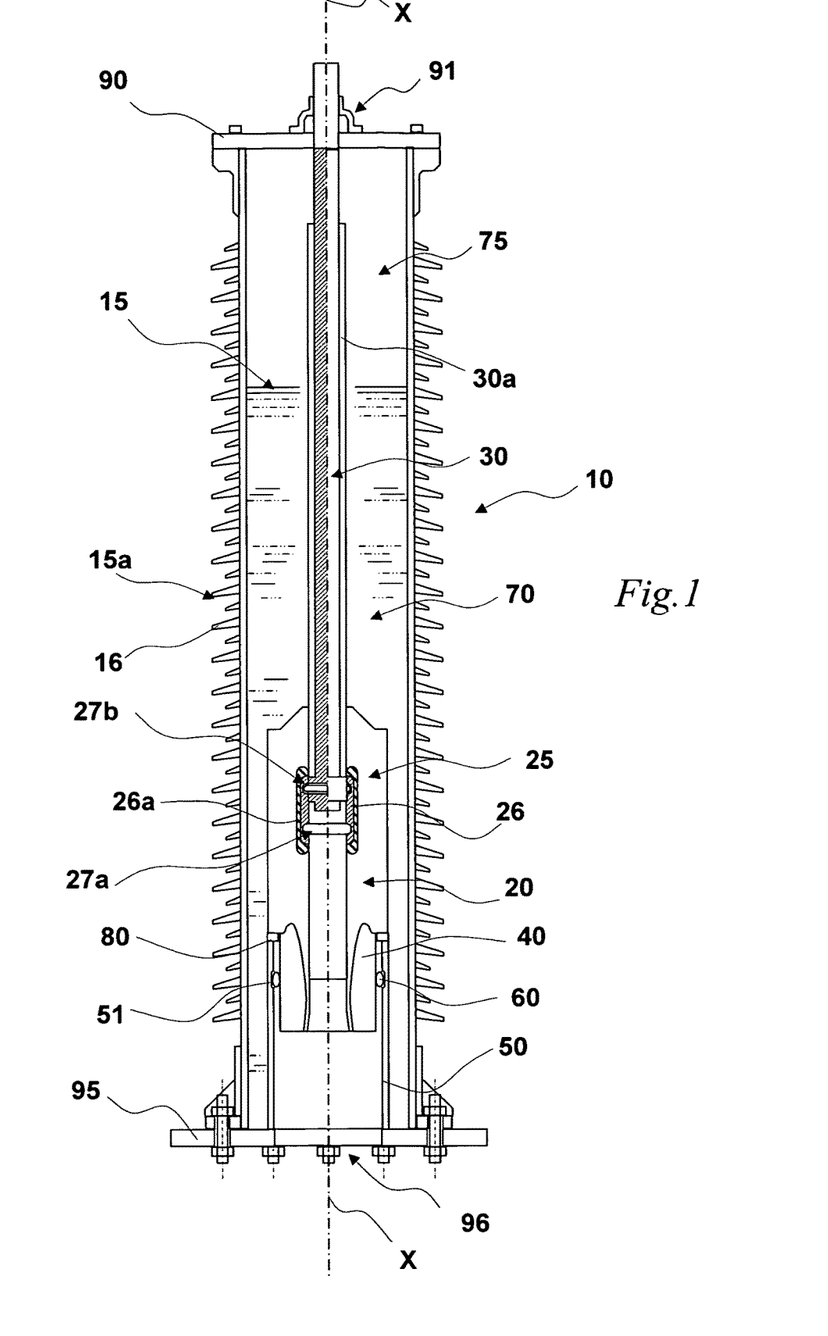
FIG. 1 is a schematic and partially sectioned view of a termination according to the present invention.

With respect to FIG. 1, a termination for electrical cables according to the present invention is indicated with numeral reference 10.

In particular, the termination of FIG. 1 is used for medium or high voltage electrical cables, but it can be also used for very high voltage electrical cables.

As will be better explained in the following of this description, the termination 10 is a pre-fabricated termination, i.e. it can be wholly assembled in a factory. Accordingly, the termination 10 can also be tested in the factory before shipping to the installation area for field installation. This allows reducing the operations to be carried out at the installation area as well as the technical skills of the operators involved.

The termination 10 comprises an outer insulation tubular body having a longitudinal axis X-X. This body comprises a portion 15a shaped so as to define a plurality of fins. Only one of these fins is indicated with 16 in FIG. 1.

Preferably, the insulation tubular body is made of a composite material.

An elastomeric sleeve 20 is coaxially arranged within the insulation tubular body 15. A connecting device 25 is coaxially arranged within the elastomeric sleeve 20.

Preferably, the elastomeric sleeve 20 comprises a pre-moulded silicone body.

A conductive rod 30 is coaxially arranged within the insulation tubular body 15. Conveniently, the conductive rod 30 is coated by an insulating layer 30a. An end portion of the conductive rod 30 (and of the relevant insulating layer 30a) is coaxially arranged within the elastomeric sleeve 20.

The connecting device 25 is of the so-called "plug-in" type. The connecting device comprises a socket body 26 having, on a first side thereof, a seat 27a adapted to house and lock into a desired axial position a plug 102 associated with the end of the conductor of an electrical cable 100 (FIGS. 8 and 9) and, on the axially opposite side, a seat 27b adapted to house and lock into a desired axial position a plug 31 (FIG. 3) associated with the end portion of the conductive rod 30. Preferably, the socket body 26 is made of conductive material (e.g. aluminium, copper or the like), and is surrounded by a semi-conductive body 26a, Each of the aforementioned plugs 102 and 31 in turn comprises a seat adapted to receive the end portion of the electrical cable 100 and of the conductive rod 30, respectively, and to hold this end portion by means of clamping, crimping, screws or welding.

Upon being associated with the end portion of the electrical cable 100 and of the conductive rod 30, respectively, the plugs 102, 31 are mechanically and electrically coupled together and to the connecting device 25 in a conventional manner (for example, as disclosed in U.S. Pat. No. 5,316, 492), thus providing mechanical and electrical connection between the electrical cable 100 and the conductive rod 30.

A cylindrical semi-conductive element 40 is coaxially arranged within the insulation tubular body 15 to provide an electrical field control.

An end portion of the semi-conductive element 40 axially extends inside the elastomeric sleeve 20 while the remaining portion of the semi-conductive element 40 axially extends outside the elastomeric sleeve 20.

A conductive tubular element 50 is coaxially arranged within the insulation tubular body 15 in a radially outer position with respect to the semi-conductive element 40.

An elastic conductive element 60 is radially arranged between the conductive tubular element 50 and the semi-conductive element 40 in a steady contact relationship with both the elastic conductive element 60 and the conductive tubular element 50, thus providing an electrical and mechanical connection between the elastic conductive element 60 and the semi-conductive element 40.

The elastic conductive element 60 exerts an elastic force onto the semi-conductive element 40 along a radial direction towards the longitudinal axis X-X so as to push the semi-conductive element 40 against a semi-conductive layer 101 of the electrical cable 100, thus realizing a steady contact relationship between the semi-conductive element 40 of the termination 10 and the semi-conductive layer 101 of the electrical cable 100, irrespective of the actual diameter of the electrical cable 100. The desired ground connection of the electrical cable 100 is thus achieved.

Preferably, more than one elastic conductive element 60 is provided. In a preferred embodiment of the invention, two elastic conductive elements 60 are arranged at different axial positions between the conductive tubular element 50 and the semi-conductive element 40.

Figure 4:
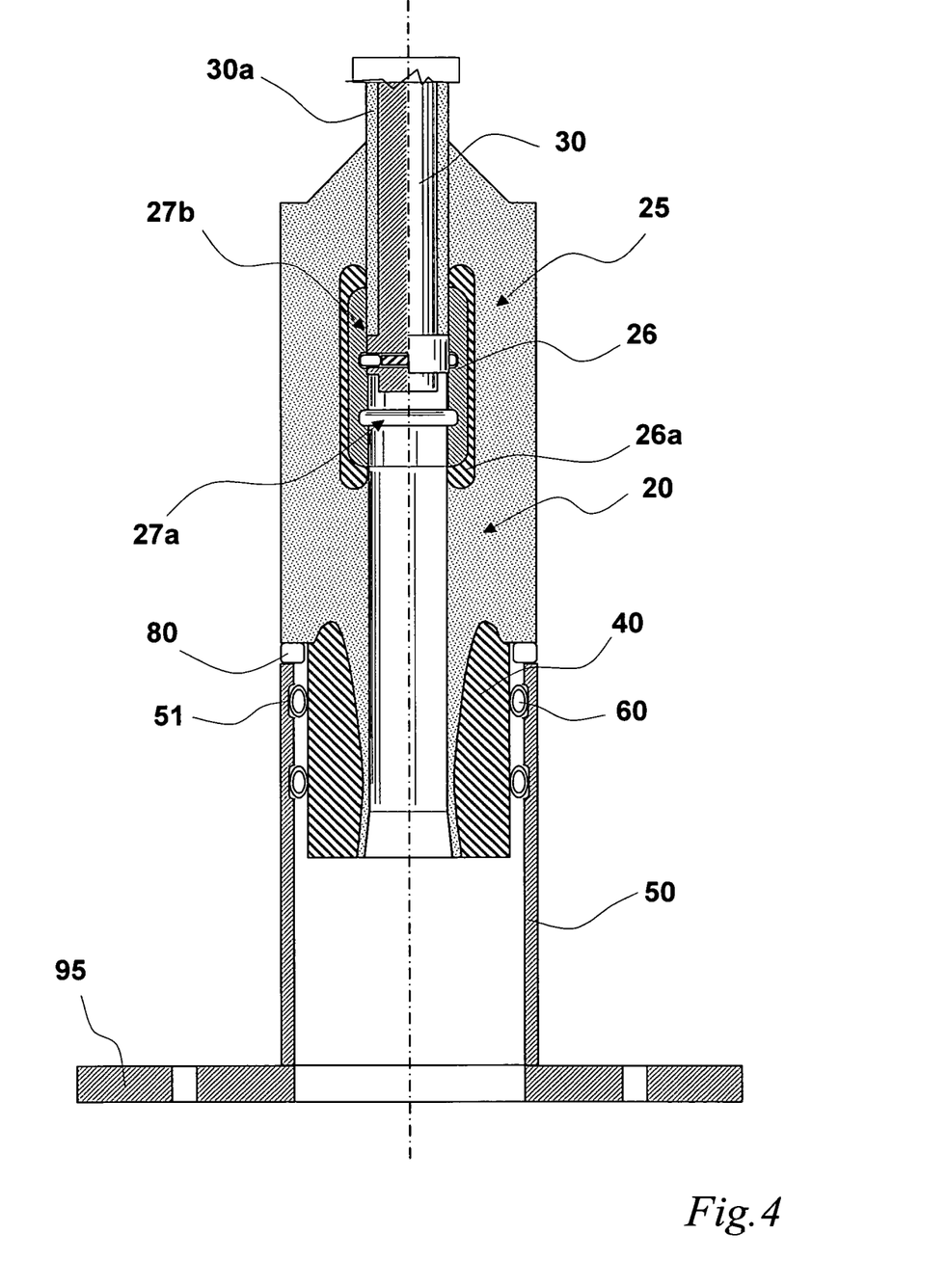
FIG. 4 is a schematic sectional view of a further step of the manufacturing process of the termination of FIG. 1.

In order to provide a steady positioning of the elastic conductive element 60 with respect to the conductive tubular element 50, an appropriate seat 51 is provided in the radially inner surface of the conductive tubular element 50 to house the radially outer surface of the elastic conductive element 60, as better shown in FIG. 4.

Figure 2:
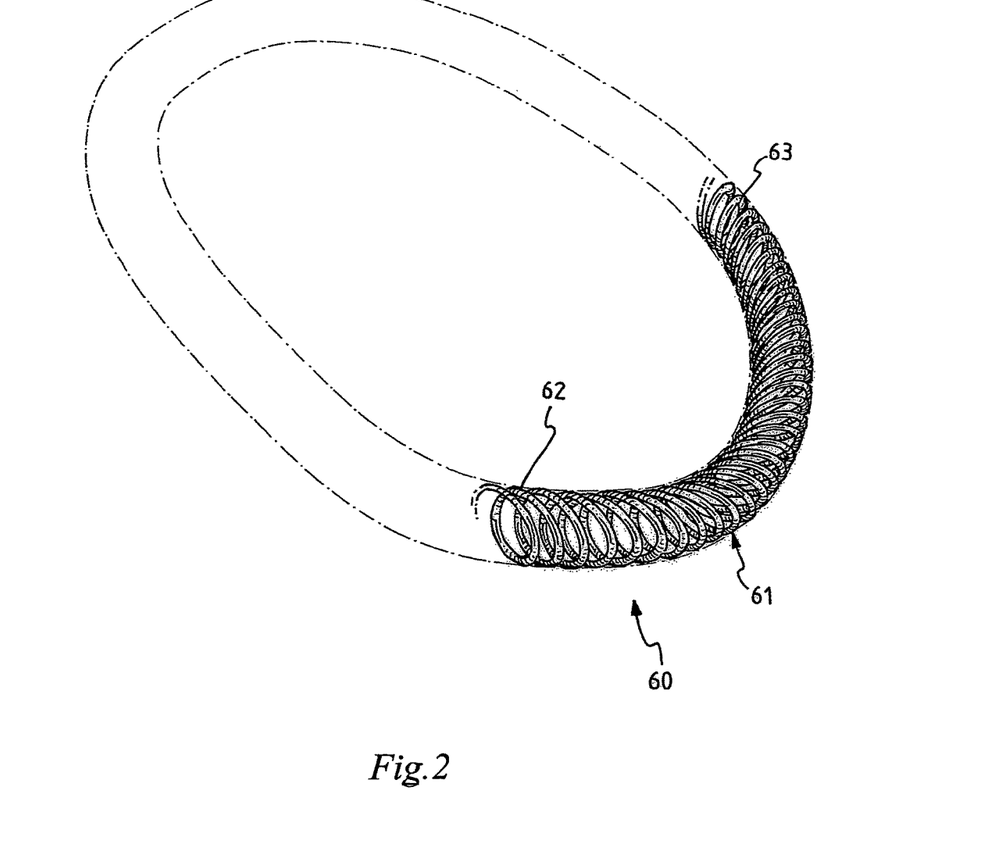
FIG. 2 is a perspective view of a conductive elastic element used in the termination of FIG. 1.

Referring now to FIG. 2, the elastic conductive element 60 is preferably an annular spring 61 made of a metallic wire 62 spirally wound along an annular path so as to define a plurality of coils. Only one of these coils is indicated with 63 in FIG. 2.

Each of the coils 63 lays on a plane which does not extend radially, that is this plane does not include the longitudinal axis X-X. This allows an elastic force to be provided in the radial direction towards the longitudinal axis X-X when the spring 61 is arranged, in a radially stressed condition, between the conductive tubular element 50 and the semi-conductive element 40 of the termination 10. The desired steady contact relationship between the semi-conductive element 40 and the semi-conductive layer 101 of the electrical cable 100 is thus obtained irrespective of the actual diameter of the electrical cable 100.

Figure 6:
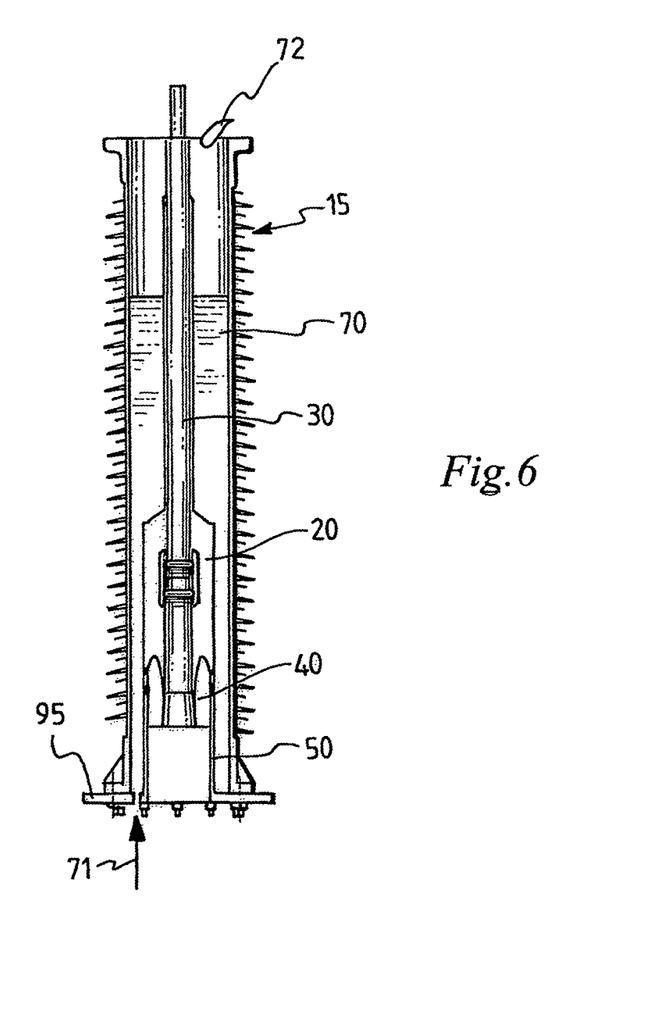
FIG. 6 is a schematic sectional view of a further step of the manufacturing process of the termination of FIG. 1.

For example, when it is used an annular spring 61 having an outer diameter of 200 mm and an inner diameter of 170 mm, the diameter of the electrical cable 100 can be in the range from 85 mm to 95 mm The insulation tubular body 15 is filled with a filling compound 70. Preferably, this filling compound 70 comprises silicone gel 71 and PE pellets 72 (FIG. 6). The amount of filling compound 70 to be filled within the insulation tubular body 15 is selected so that when the termination 10 is in an upright position as that shown in FIG. 1, the filling compound 70 reaches a predetermined height. In this configuration, a portion 75 of the cavity defined between the insulation tubular body 15 and the conductive rod 30 is not filled with the filling compound 70.

The silicone gel 71 is filled into the insulation tubular body 15 in a liquid state. After polymerisation, it reaches a soft solid-state so that it is prevented to flow out the insulation tubular body 15.

In an alternative embodiment, the insulation tubular body 15 is filled with oil or other appropriate insulating fluid.

As shown in FIG. 1, a leak-tight element 80 (for example, an annular gasket) is coaxially arranged within the insulation tubular body 15. The leak-tight element 80 is axially interposed between the elastomeric sleeve 20 and the conductive tubular element 50, so as to avoid the filling compound 70 to flow within the conductive tubular element 50, thus providing the desired axial tightness within the termination.

In addition thereof, the leak-tight element 80 acts as an intermediate pad between the elastomeric sleeve 20 and the conductive tubular element 50, thus preventing any friction or rubbing between the elastomeric sleeve 20 and the conductive tubular element 50 and allowing the weight of the elastomeric sleeve 20 and of the terminal's component connected to the elastomeric sleeve 20 not to directly bear onto the conductive tubular element 50, preventing a possible indentation of the elastomeric sleeve 20.

Preferably, the leak-tight element 80 is made of a rubber-like material.

Preferably, the leak-tight element 80 has an annular shape with a substantially rectangular cross-section.

The leak-tight element 80 has a thickness of some millimeters, preferably from about 5 to about 15 mm.

The tightness between the elastomeric sleeve 20 and the conductive tubular elements 50 is provided in the axial direction. This ensures that the seal is not affected, or at least affected in a minor amount, by the expansion or contraction of the elastomeric sleeve, which acts mainly in the radial direction.

A cover plate 90 is provided at a free end of the insulation tubular body 15. The cover plate 90 comprises a central hole 91 for allowing insertion of the conductive rod 30 into the insulation tubular body 15.

A flange 95 is provided at the free end of the insulation tubular body 15 opposite the cover plate 90. The flange 95 comprises a central hole 96 for allowing insertion of the electrical cable 100.

Preferably, the flange 95 is made in a single piece with the conductive tubular element 50, welded or otherwise secured thereto.

With reference to FIGS. 3 to 6, a method for manufacturing the termination 10 of the present invention is described below. This method can be entirely carried out within the factory.

Figure 3:
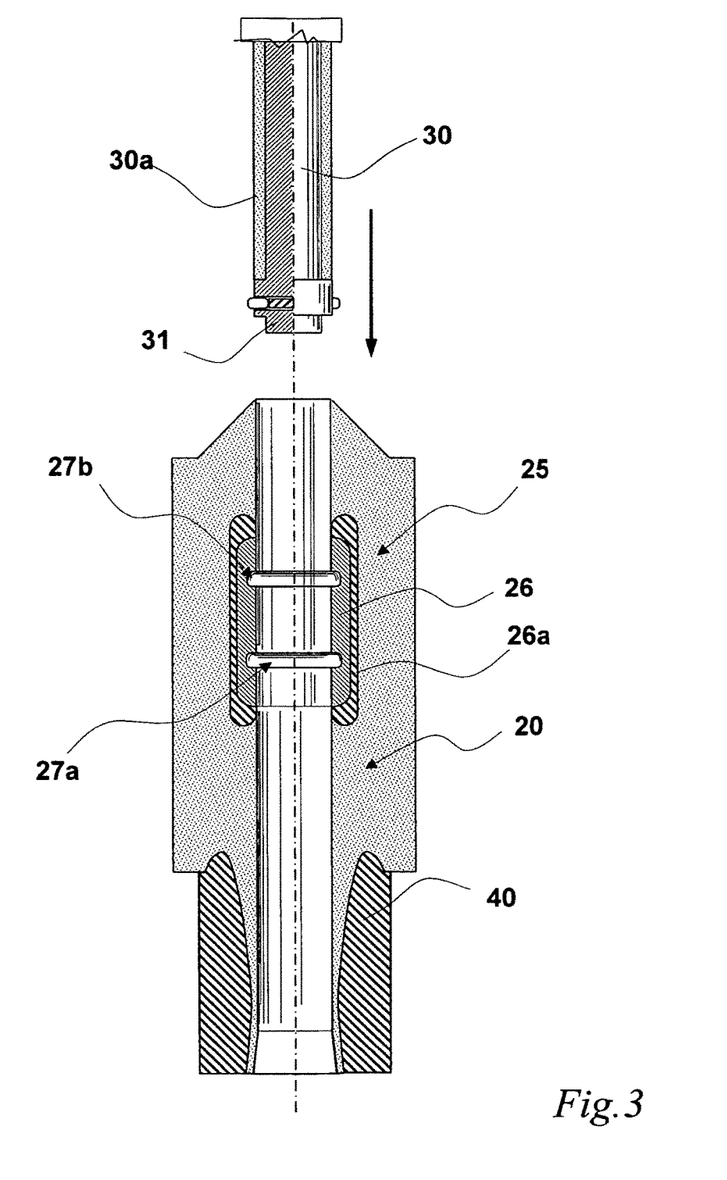
FIG. 3 is a schematic sectional view of a step of the manufacturing process of the termination of FIG. 1.

Firstly, an elastomeric sleeve 20 including the connecting device 25 and the first axial portion of the semi-conductive element 40 is provided. As shown in FIG. 3, the remaining axial portion of the semi-conductive element 40 extends outside the semi-conductive element 40.

The elastomeric sleeve 20 is supported in an upright position and the conductive rod 30 is inserted from the above and locked into the seat 27b of the connecting device 25 (FIG. 3).

On the other hand, the elastic conductive element 60 is housed in the seat 51 of the conductive tubular element 50 and the leak-tight element 80 is arranged at the upper end portion of the conductive tubular element 50.

The conductive tubular element 50 is then fitted onto the second portion of the semi-conductive element 40 from below so as to reach the configuration shown in FIG. 4, wherein the elastomeric sleeve 20 rests onto the leak-tight element 80 and the elastic conductive element 60 is interposed, in a radially stressed condition, between the semi-conductive element 40 and the conductive tubular element 50.

Figure 5:
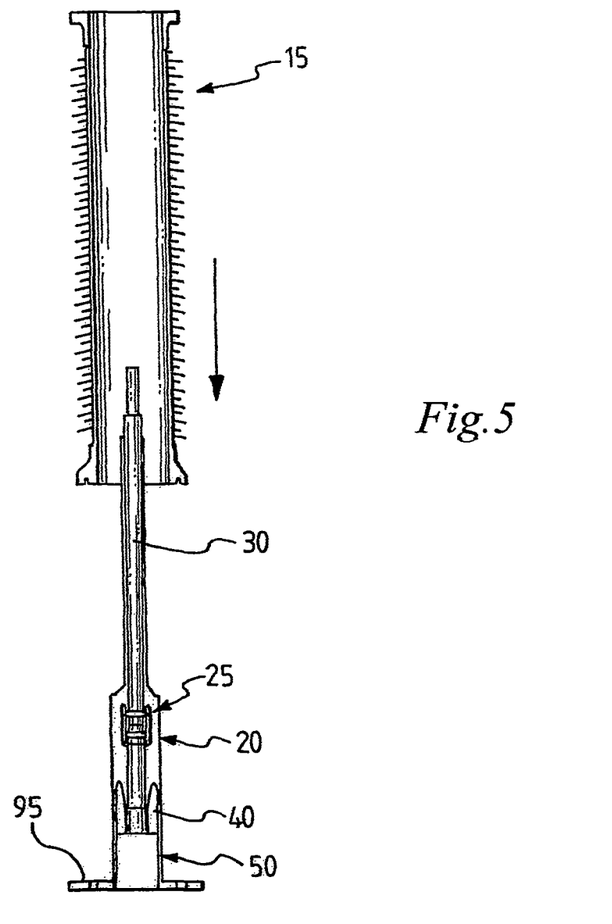
FIG. 5 is a schematic sectional view of a further step of the manufacturing process of the termination of FIG. 1.

The insulation tubular body 15 is then fitted from the above onto the conductive rod 30, as shown in FIG. 5, and is connected to the flange 95 as shown in FIG. 6.

A filling compound 70 is then filled into the insulation tubular body 15 up to reach a predetermined height. As shown in FIG. 6, filling of the filling compound 70 comprises filling the silicone gel 71 into the insulation tubular body 15 from below and introducing the PE pellets 72 into the insulation tubular body 15 from the above.

The cover plate 90 is then associated to the upper end of the insulation tubular body 15, thus obtaining the termination 10 shown in FIG. 1.

The termination 10 manufactured according to the method described above is tested in the factory before shipping to the installation area.

Figure 7:
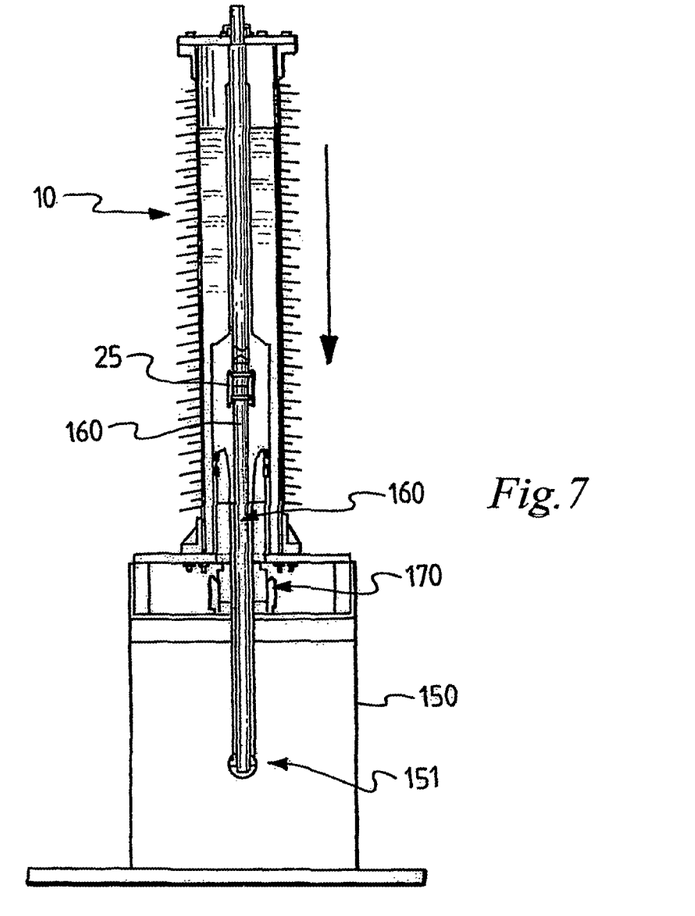
FIG. 7 is a schematic sectional view of the termination of FIG. 1 in a factory testing configuration.

As shown in FIG. 7, in order to properly test the termination 10 a test vessel 150 filled with oil 151 and having a test cable 160 partially inserted therein and kept in vertical position is used.

The termination 10 is fitted from the above onto the portion of the test cable 160 extending above the test vessel 150. The upper end portion of the test cable 160 is locked to the connecting device 25 of the termination 10 and the termination 10 is clamped to the test vessel 150 by appropriate clamping devices 170.

The required electrical routine tests can then be carried out.

Upon being tested, the termination 10 can be shipped to the installation area for carrying out the field installation.

Figure 8:
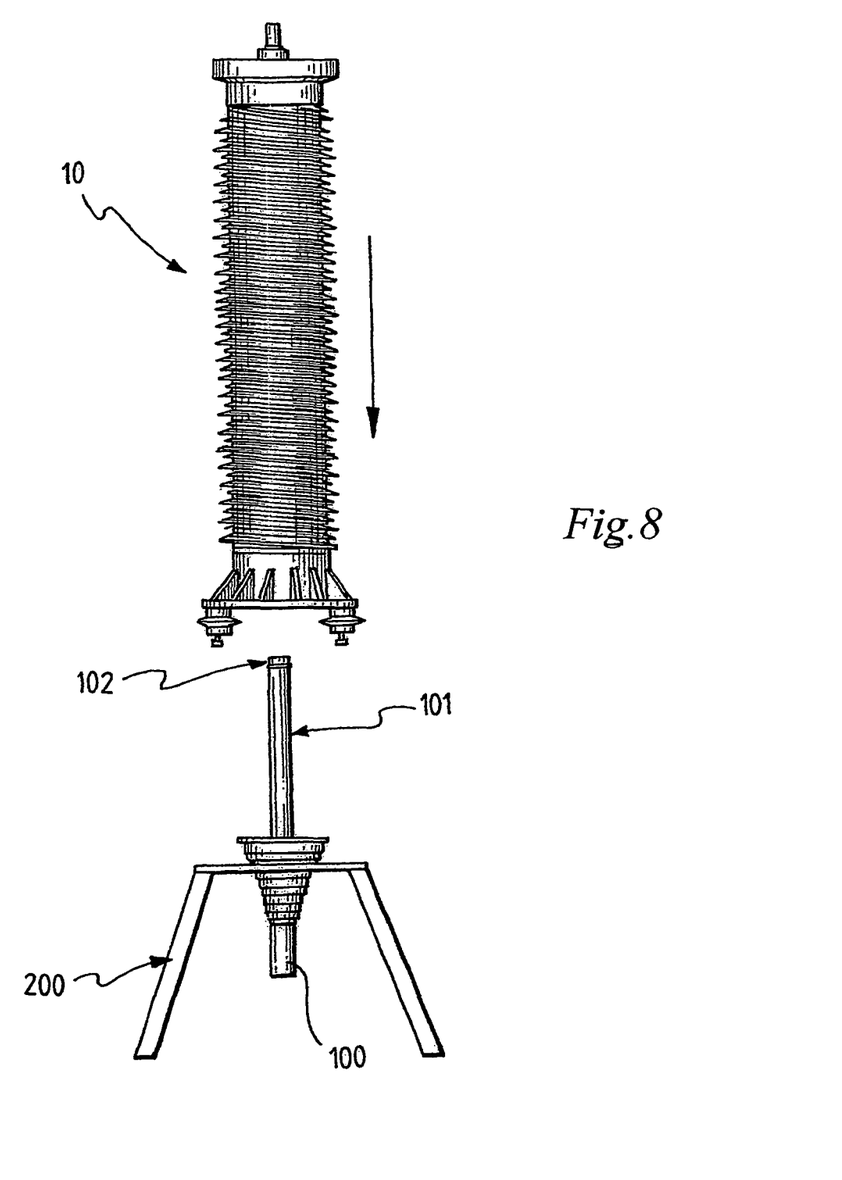
FIG. 8 is a schematic view of a step of the field installation of the termination of FIG. 1.
Figure 9:
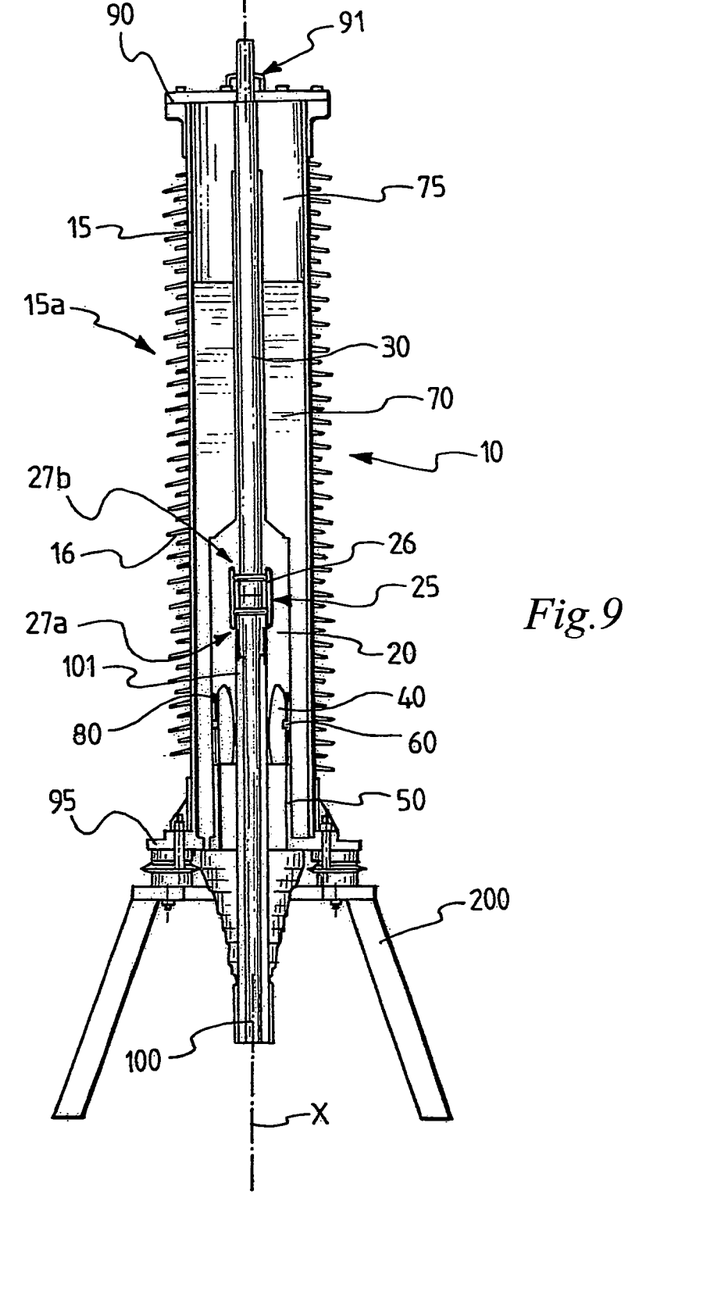
FIG. 9 is a schematic view of a further step of the field installation of the termination of FIG. 1.

As shown in FIGS. 8 and 9, the installation operation comprises the provision of a framework 200 at the installation area.

The electrical cable 100 is then prepared in such a manner that the conductors axially project by a predetermined amount with respect to all the radially outer layers and that semi-conductive layer 101 axially projects by a predetermined amount portion with respect to the respective radially outer layers.

The plug 102 is then associated to the conductors of the electrical cable 100 and the electrical cable 100 is associated with the framework 200 and kept in vertical position, as shown in FIG. 8.

The termination 10 is then fitted from the above onto the portion of the electrical cable 100 extending above the framework 200. The plug 102 is locked to the connecting device 25 of the termination 10 and the termination 10 is clamped to the framework 200 by appropriate clamping devices, so as to reach the operative configuration shown in FIG. 9.

From the above it is clear that the elastic conductive element 60 provides for a controlled radial expansion/contraction of the semi-conductive element 40 to be allowed while at the same time maintaining a steady contact relationship between the semi-conductive element 40 of the termination and the semi-conductive layer 101 of the electrical cable 100, thus providing the electrical cable 100 with the desired ground connection irrespective of the actual diameter of the electrical cable 100.

The elastic conductive element 60 further elastically supports the semi-conductive element 40 and the elastomeric sleeve 20 when the termination 10 is arranged in a horizontal position and shipped from the factory to the installation area.

The elastic conductive element 60 further facilitates the assembling operation of the termination 10 in the factory by properly supporting in the desired coaxial position the elastomeric sleeve 20 with respect to the conductive tubular element 50 through the semi-conductive element 40.

The elastic conductive element 60 further contributes to segregate the filling compound 70 within the insulation tubular body 15 should undesired leakage of the filling compound 70 occur.

In addition thereof, by providing an increased radial pressure against the electrical cable 100, the elastic conductive element 60 further contributes to increase the electrical capacity of the termination 10 to withstand to electrical discharges and breakdowns. Indeed, the higher is the above radial pressure the higher is the above electrical capacity.

Furthermore, the elastic conductive element 60 provides for an explosion-proof barrier. Indeed, the elastic conductive element 60 is preferably sized so as to be able to withstand to the breakdown currents which could be generated should a breakdown occur in operation.

In addition thereof, the elastic conductive element 60 allows discharging to the ground, through the conductive tubular element 50, the capacitive current collected by the semi-conductive element 40 when it is put in contact with the semi-conductive layer 101 of the electrical cable 100.

The invention claimed is:

1. A termination for electrical cables, the termination comprising:
   an outer insulation tubular body having a longitudinal axis;
   a conductive rod coaxially arranged within the insulation tubular body;
   an elastomeric sleeve coaxially arranged within the insulation tubular body and extending about an end portion of the conductive rod;
   a connecting device coaxially arranged within the elastomeric sleeve, wherein the connecting device is mechanically and electrically connected to the conductive rod and is configured to mechanically and electrically connect to an electrical cable;
   a conductive tubular element coaxially arranged within the insulation tubular body and configured to electrically connect to ground;
   a semi-conductive element coaxially arranged within the conductive tubular element and partially extending inside the elastomeric sleeve on an opposite side to the conductive rod with respect to the connecting device; and
   at least one elastic conductive element radially interposed between, and in contact with, the conductive tubular element and the semi-conductive element, the at least one elastic conductive element arranged out of the semi-conductive element and having a radially inner surface contacting the semi-conductive element and a radially outer surface contacting the conductive tubular element, the at least one elastic conductive element configured to exert an elastic force onto the semi-conductive element along at least one radial direction toward the longitudinal axis, the semi-conductive element being displaced with respect to the longitudinal axis, depending on an actual diameter of the electrical cable, under the elastic force exerted by the at least one elastic conductive element.

2. The termination of claim 1, further comprising:
   a leak-tight element axially interposed between the elastomeric sleeve and the conductive tubular element.

3. The termination of claim 1, further comprising:
   at least two elastic conductive elements arranged at different axial positions.

4. The termination of claim 1, wherein the at least one elastic conductive element comprises at least one annular spring coaxially arranged within the conductive tubular element in a radially outer position with respect to the semi-conductive element.

5. The termination of claim 4, wherein the at least one annular spring comprises a metallic wire spirally wound along an annular path extending about the longitudinal axis to define a plurality of coils.

6. The termination of claim 5, wherein each of the plurality of coils lays on a plane that does not include the longitudinal axis.

7. The termination of claim 1, wherein the insulation tubular body is at least partially filled at least with silicone gel.

8. The termination of claim 1, wherein the connecting device comprises:
   a first seat for a plug-in connection to the electrical cable; and
   an axially opposite seat for a plug-in connection to the conductive rod.

9. The termination of claim 2, further comprising:
   at least two elastic conductive elements arranged at different axial positions.

10. The termination of claim 2, wherein the at least one elastic conductive element comprises at least one annular spring coaxially arranged within the conductive tubular element in a radially outer position with respect to the semi-conductive element.

11. The termination of claim 3, wherein each of the at least two elastic conductive elements comprises at least one annular spring coaxially arranged within the conductive tubular element in a radially outer position with respect to the semi-conductive element.

12. The termination of claim 2, wherein the insulation tubular body is at least partially filled at least with silicone gel.

13. The termination of claim 3, wherein the insulation tubular body is at least partially filled at least with silicone gel.

14. The termination of claim 4, wherein the insulation tubular body is at least partially filled at least with silicone gel.

15. The termination of claim 2, wherein the connecting device comprises:
- a first seat for a plug-in connection to the electrical cable; and
- an axially opposite seat for a plug-in connection to the conductive rod.

16. The termination of claim 3, wherein the connecting device comprises:
- a first seat for a plug-in connection to the electrical cable; and
- an axially opposite seat for a plug-in connection to the conductive rod.

17. The termination of claim 1, wherein the at least one elastic conductive element is configured to exert the elastic force radially inwardly directed onto the semi-conductive element along the at least one radial direction toward the longitudinal axis.

18. The termination of claim 1, wherein the semi-conductive element is displaced radially inwardly with respect to the longitudinal axis, depending on the actual diameter of the electrical cable, under the elastic force exerted by the at least one elastic conductive element.

19. A termination for electrical cables, the termination comprising:
- an outer insulation tubular body having a longitudinal axis;
- a conductive rod coaxially arranged within the insulation tubular body;
- an elastomeric sleeve coaxially arranged within the insulation tubular body and extending about an end portion of the conductive rod;
- a connecting device coaxially arranged within the elastomeric sleeve, wherein the connecting device is mechanically and electrically connected to the conductive rod and is configured to mechanically and electrically connect to an electrical cable;
- a conductive tubular element coaxially arranged within the insulation tubular body and configured to electrically connect to ground;
- a semi-conductive element coaxially arranged within the conductive tubular element and partially extending inside the elastomeric sleeve on an opposite side to the conductive rod with respect to the connecting device; and
- at least one elastic conductive element radially interposed between, and in contact with, the conductive tubular element and the semi-conductive element, the at least one elastic conductive element arranged out of the semi-conductive element and having a radially inner surface contacting the semi-conductive element and a radially outer surface contacting the conductive tubular element, the at least one elastic conductive element configured to exert an elastic force radially inwardly directed onto the semi-conductive element along at least one radial direction toward the longitudinal axis, the semi-conductive element being radially inwardly displaced with respect to the longitudinal axis, depending on an actual diameter of the electrical cable, under the elastic force exerted by the at least one elastic conductive element.

20. The termination of claim 19, further comprising:
- a leak-tight element axially interposed between the elastomeric sleeve and the conductive tubular element.

* * * * *